(12) United States Patent
Ageby et al.

(10) Patent No.: US 7,082,136 B2
(45) Date of Patent: Jul. 25, 2006

(54) METHODS FOR CONTROLLING RESOURCES IN A COMMUNICATION NETWORK

(75) Inventors: Johan Ageby, Stockholm (SE); Erik Brage, Stockholm (SE)

(73) Assignee: Net Insight AB, Stockholm (SE)

( * ) Notice: Subject to any disclaimer, the term of this patent is extended or adjusted under 35 U.S.C. 154(b) by 956 days.

(21) Appl. No.: 10/025,991

(22) Filed: Dec. 26, 2001

(65) Prior Publication Data

US 2002/0093965 A1 Jul. 18, 2002

(30) Foreign Application Priority Data

Dec. 29, 2000 (SE) .................................... 0004896
Jul. 10, 2001 (SE) .................................... 0102471

(51) Int. Cl.
  *H04B 7/212* (2006.01)
(52) U.S. Cl. ..................................... 370/400
(58) Field of Classification Search ................ 370/347, 370/442, 443, 444, 445, 461, 462, 222, 223–228, 370/450, 449, 452, 453, 455, 459, 460, 403, 370/404

See application file for complete search history.

(56) References Cited

U.S. PATENT DOCUMENTS 4,866,708 A 9/1989 Ardon et al.

2003/0067873 A1* 4/2003 Fuhrmann et al. .......... 370/230
2004/0081193 A1* 4/2004 Forest et al. ................ 370/458

FOREIGN PATENT DOCUMENTS

| WO | 97/36402 | 10/1997 |
| WO | 98/52324 | 11/1998 |
| WO | 01/33775 | 5/2001 |
| WO | 01/33776 | 5/2001 |

OTHER PUBLICATIONS

L. Ramfelt, "Performance Analysis of Slot Management in DTM Networks", Technical Report TRITA-IT R 95:23, Dept. of Teleinformatics, KTH, Stockholm, Jan. 1, 1996.

* cited by examiner

*Primary Examiner*—Dang Ton
(74) *Attorney, Agent, or Firm*—Bingham McCutchen LLP

(57) ABSTRACT

The present invention refers to the field of communication networks having a number of nodes connected to the same link, the capacity of the link being divided into frames which in turn are divided into time slots. A procedure is used for informing each node on the link of which nodes that are connected to the link and which slots that it has access to. A verifying procedure is used for subsequently verifying that information separately held by said nodes is not inconsistent regarding the nodes' right to allow sending of data in said slots. In addition, said verifying procedure is disabled from producing a positive verification during transition periods at which different nodes on the link risk having inconsistent link data.

24 Claims, 4 Drawing Sheets

METHODS FOR CONTROLLING RESOURCES IN A COMMUNICATION NETWORK

FIELD OF THE INVENTION

The invention refers in general to a method for controlling resources in a communication network having a number of nodes connected to the same link, the capacity of the link being divided into frames which in turn are divided into time slots.

BACKGROUND OF THE INVENTION

In communication networks of the above mentioned kind, different schemes are used for determining which nodes that should have access to which slots, i.e. have the right to set up communication channels and start sending data using said slots. Such schemes include those that allow modification, over time, of which nodes that have access to which slots, for example to adapt to different nodes varying need for transfer resources or to adapt to the situation that nodes are added or removed from the link.

For example, WO9736402 discloses a communication network, wherein different nodes are assigned so-called ownership of different slots. A node that owns a slot has the right to allocate the slot for use by one of the communication channels handled by the node. This document also suggest that a slot that is owned by a first node may be temporarily "lent" to a second node, allowing the second node to temporarily use the slot for sending data, after which the second node "returns" the slot to the owner thereof. Furthermore, ownership to the slot can be transferred from one node to another, thereby transferring the right to control how the slot is to be used.

In networks of this and similar kind, it is vital to ensure that no two nodes send data using the same slot over the same link segment simultaneously, thereby risking to compromise each others traffic. This is sometimes referred to as ensuring that the allocation of slots is "conflict-free".

The object of the invention is to solve the problem of how to efficiently allow and perform dynamic alterations in the network while at the same time ensuring conflict-free allocation of resources using a simple mechanism.

SUMMARY OF THE INVENTION

The object of the invention is achieved by the invention as set forth in the accompanying claims.

According to an embodiment of the invention, there is provided a method of the above mentioned kind comprising: a procedure for informing each node on the link of which nodes that are connected to the link and which slots that it has access to; a verifying procedure for subsequently verifying that information separately held by said nodes is not inconsistent regarding the nodes' right to allow sending of data in said slots; and the step of disabling said verifying procedure from producing a positive verification during transition periods at which different nodes on the link risk having inconsistent link data.

Use of a verifying procedure for verifying, for example, that a node is free to use a specific slot may produce an erroneous verification when alterations are taking place on the link. This is especially true for alterations affecting data being of a type that different nodes participating in said verifying procedure use as a basis for determining their input to said verifying procedure. For example, when changes in the number of nodes that are connected to a link take place, or when changes in which node that controls allocation of which slots take place, different nodes will gain knowledge of said change at different points in time and may thus participate in a verification procedure based upon inconsistent view's of the status of the link. Advantageously, according to the invention, to avoid this resulting in erroneous verifications, the verification procedure is disabled during such periods of change. And as the node relies on the verification procedure as a prerequisite for actually putting new slots into use, no such activities can be undertaken while the verification procedure is disabled, thereby ensuring that no slot access conflict causes two nodes to start sending data into the same slot simultaneously.

Preferably, any node detecting the occurrence of such a type of change into new link state will disable the verification procedure until it has received acknowledgement that other nodes are aware of the new link state. If, as preferred, the verification procedure comprises one node sending an verification request and expecting all other nodes on the link to reply to said request, any node can advantageously, according to the invention, disable the verification procedure by simply not sending replies to the verification request.

Thus, as soon as one node on the link becomes aware of the risk of inconsistency, for example by having its Link State Protocol reporting new data on which other nodes that are connected to the link, the other nodes will become indirectly aware of it since the node will not respond to inquiries. This is very advantageous compared to the alternative where a warning message is sent from the interface that becomes aware of the risk of conflicts, since such warning message will always run the risk of not reaching all of its intended recipients.

Thus, the method according to the invention ensures that a situation where there is a risk of inconsistency in the distribution of access to time slots is recognized and dealt with fast so that the situation where two interfaces consider themselves to have access to the same time slot is prevented, especially during link state changes.

Furthermore, the use of the idea that no reply is a negative reply makes the method insensitive to loss of messages and thus reliable in a network where there are alterations.

Note however that alternative embodiments could allow nodes to send replies during the periods of change, as long as such messages implies that slots are free for use. A node could for example continue sending verification replies, however indicating warnings or indicating that no slots should be put into use before all nodes have the same view of the new link state.

BRIEF DESCRIPTION OF THE DRAWINGS

An exemplifying embodiment of the invention will now be described with reference to the accompanying drawings, in which:

FIG. 1b illustrates an exemplary frame structure used in the network of FIG. 1a; and FIGS. 2, 3, and 4 are schematic signaling diagrams illustrating message-exchanges among the nodes of the network in FIG. 1a.

DETAILED DESCRIPTION OF PREFERRED EMBODIMENTS

Figure 1A:
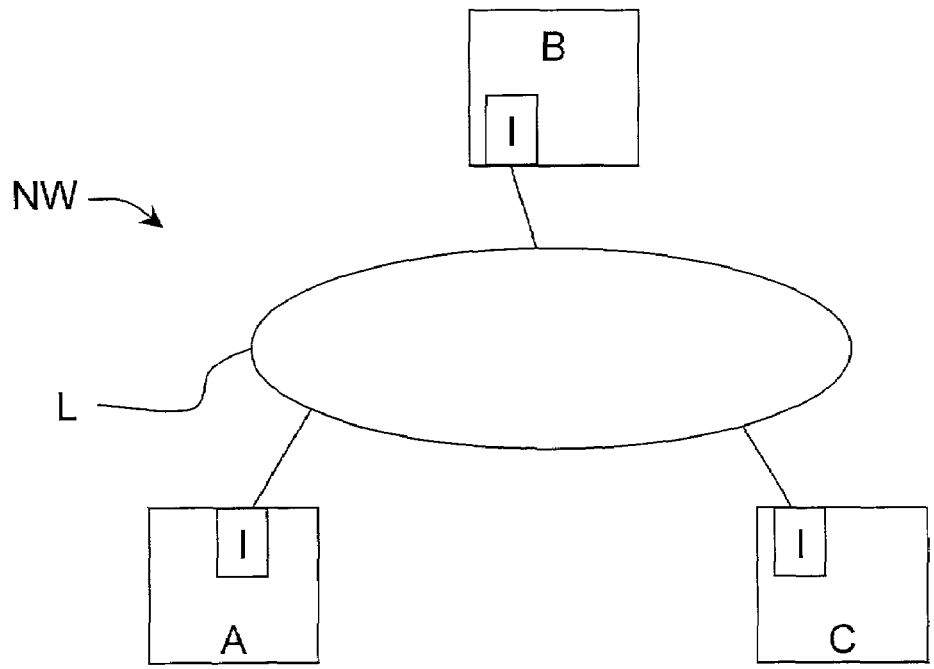
FIG. 1a illustrates an exemplary network of the kind addressed by the invention.
Figure 1B:
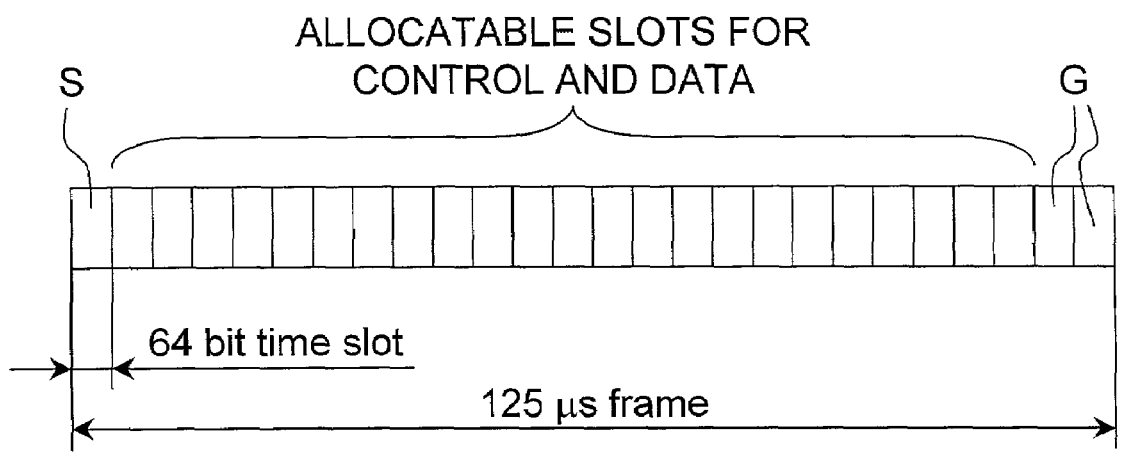

An exemplary communication network NW of the kind addressed by the invention is shown in FIG. 1a and comprises three nodes A, B, and C that each is connected to a single ring link L via respective link interfaces I. On the link L, a recurrent, essentially fixed size frame of the kind illustrated in FIG. 1b is transported uni-directionally.

In the exemplified network, the capacity of the link L is divided into frames, each having a nominal duration of 125 μs and is turn being divided into a fixed number of 64-bit time slots. The start of each frame is identified by a so-called synchronization slot S, and the end of each frame is provided with so-called fill slots F included to accommodate for small jitters in the network frame frequency. The remaining slots of the frame are slots to be allocated used for transporting control signaling and payload data, respectively, between the link interfaces I connected to the link L. This type of frame format is for example used in so-called DTM networks (DTM—Dynamic synchronous Transfer Mode).

The three nodes A, B, and C are assigned ownership of respective slots on the link L, i.e. to respective sets of slot positions within each recurring frame on link L. Slot ownership is determined by a master node on the link (said master being appointed as the node having, as far as the nodes are aware, the lowest link layer address on the link). In the figures, it is assumed that node A is the master node on the link. Any node having been assigned ownership of a slot by the master node may allocate the slot to form part of a communication channel, or it may decide to lend the slot to another node that for one reason or another requests more resources. Note that the owner of a slot hence need not necessarily have immediate write access to the slot, as the write access to the slot may have been borrowed by another node on the link. Note also that whereas the distribution of slot ownership is controlled centralized by the master node, the decision to lend the actual write access to the slot, as well as the obligation to initiate verifications with respect to the slot, rests with the node that is the owner of the slot.

Management of access to slots is handled by control messages sent and received by the nodes of the network using predefined control channels, said messages including the following message types:

A Change (CH) message is sent by a master node on the link (said master node being appointed as the node having the lowest link layer address on the link) to inform the nodes connected to the link of changes in which nodes are connected to the link and in the distribution of slot ownership among said nodes. The Change message comprises a list of the nodes connected to the link together with a respective scalar corresponding to the time slots that the nodes are allocated ownership of on the link. The Change message is forwarded to reach all nodes on the link on a node-to-neighbor-node-basis until it the last node on the link returns the message to the master node. If the master hasn't received the Change message within a predefined period of time, it will resend the Change message. A node that receives a Change message will only store the information contained therein and forward the massage if the list of nodes identified therein is consistent with the list of nodes that the node's own Link Status Protocol has determined for the subject link. Otherwise, the node will discard the Change message and thus forward it to a next node.

An Ownership Request (OR) message is sent to the master node from any node that receives a Change message and is unhappy with the amount of resources that it has been allocated in the Change message. The Ownership Request message identifies the amount of slots that the sending node would like to have ownership of.

A Verification Request (VREQ) message is used when a node wants to verify the write access situation with respect to one or more time slots that it is the owner of. It is a message that is sent from the investigating node to all other nodes on the same link and identifies the slot (or slots) that the verification pertains to. A node will repeatedly send Verification Request messages with respect to the slots that is the owner of. For slots that it has not lent to any other node, it will use the Verification Request message to verify that no other node believes itself to have any access right to said slots. For slots it has lent to other nodes, it will use the Verification Request message to verify that said other nodes still regard themselves as borrowing said slots and that they hence, for example, haven't ended borrowing the slots without any message indicative thereof having been received by the owner of the slot. Moreover, for all new slots that a node is assigned ownership of in a Change message, either during operation or at link start-up, it will send a Verification Request message to these now slots, to verify that no other node regards itself as having access to said slots, such verification, received from all other nodes on the link, being a prerequisite for the node to start allocating said slots for actual use and thereby allowing data to be sent in said slots.

A Verification Reply (VREP) message is used by each node as the reply to a received Verification Request message. It is a unicasted message that is sent from each node that has received a Verification Request message to the node that was the sender of that Verification Request message. It identifies whether or not the node sending the Verification Reply message considers itself as having access to the slot (or slots) that the Verification Request message pertained to, for example by regarding itself to be the owner of the slot or to be currently borrowing the slot.

A Resource Announce (RES_ANN) is sent by each node, telling all other nodes on the link how many slots it currently is willing to lend to other nodes. Other nodes that receive this message store this information to know which node to ask for resources if in need to borrow such.

A Resource Request (RES_REQ) message is sent from a node that needs to borrow slots to the node that it tries to borrow slots from, and identifies the number of slots that it would like to borrow.

A Resource Transfer (RES_TR) message is used when a node lends (or returns after borrowing) access to a slot to another node. It is sent from the node that transfers the slot access to the node that receives the node access and identifies the slot (or slots) for which access is transferred.

An Interrupt (IN) message is sent by the node having the ownership of a slot when detecting, via a verifying procedure, that two or more nodes are accessing the same slot. The Interrupt message is sent to instruct these node to stop using the slot so that no more than one node on the link has access to the slot.

In this exemplifying embodiment, each node will keep a state for all slots one the link. From the point of view of the individual node, each individual slot on the link will always occupy one (and one alone) of the following states:

FREE: The node owns the slot and it has been verified that it is free for the node to use. The slot can be allocated to a channel or lent to another node as desired. If the node receives a Change message indicating that it is no longer the owner of the slot, it will change the status of the slot to GONE (se below). If the node receives an Interrupt message, implying that there is an access conflict and instructing the node to stop using the slot, it will do so, and change the state of the slot to LENT.

LENT: The node owns the slot but has lent it to another node. When the slot is returned, the node will change the status of the slot to FREE. At repeated intervals, slots in the LENT state will be transferred to the VERIFYING state (se below) to verify that they have not been "lost" but is in fact still used by other nodes. If the node receives a Change message indicating that it is no longer the owner of the slot, it will change the status of the slot to GONE (se below). Also, at start-up, all slots owned by the node are considered to be lent until a verification procedure has verified that that is not the case.

GONE: The node is not the owner of the slot and has not borrowed it from another node. If the node receives a Change message indicating that has become the owner of the slot, it will change the status of the slot to LENT.

BORROWED: The node is not the owner of the slot, but is using it while having borrowed it from another node. When returning the slot to the owner after having borrowed it, the node will change the status of the slot to GONE. If the node receives a Change message indicating that has become the owner of the slot, it will change the status of the slot to BUSY (se below). If the node receives an Interrupt message, implying that there is an access conflict and instructing the node to stop using the slot, it will do so, and change the state of the slot to GONE.

BUSY: The node is the owner of the slot and is using the slot (i.e. it has been actually been allocated to a communication channel). If the node receives a Change message indicating that it is no longer the owner of the slot, the node will change the status of the slot to LENT. If the node receives an Interrupt message, implying that there is an access conflict and instructing the node to stop using the slot, it will do so, and change the state of the slot to LENT.

VERIFYING: The slot is undergoing an examination of whether some other node claims any access to the slot or not. When the node has received Verification Replies from all other nodes on the link, indicating the no other node is using the slot or considers itself to have any other access to the slot, the node will change the state of the slot to FREE. If the Verification Replies indicated that another node is using the slot, it will change the state of the slot to LENT. If the Verification Replies indicate that two or more other nodes are using the slot, the node will send Interrupt messages to all but one of these nodes to immediately resolve the conflict. If the node receives a Change message indicating that it is no longer the owner of the slot, the node will change the status of the slot to GONE.

In an alternative embodiment in which different nodes are allowed to send data in the same slot position, but over separate segments of the link to ensure that data is not corrupted, the above set of states is managed by the node on a per-slot-and-segment basis and not merely on a per-slot basis, as the slot, from the node's point of view, can be in different states for different segments of the link.

In addition to the above, each node keeps track on whether or not sending of Verification Request and Reply messages is currently allowed. If a change is currently taking place regarding which nodes that are connected to the link or regarding the distribution of slot ownership, Verification Request and Reply messages are temporarily not allowed, as described more specifically in the following.

In this exemplifying embodiment, a node will disable verification by refraining from sending Verification Request and Verification Reply messages when: a) its Link State Protocol detects a change in which nodes that are connected to the link; or b) the node receives a Change message identifying a list of nodes that is inconsistent with the list last reported by the node's own Link State Protocol. The node will resume sending Verification Request messages and Verification Reply messages when it receives a Change message identifying a list of nodes that is consistent with the list last reported by the nodes own Link State Protocol.

Furthermore, a master node on the link will disable verification by refraining from sending Verification Request and Verification Reply messages when its Link State Protocol reports a change in which nodes that are connected to the link. It will then transmit a Change message reflecting the new list of nodes connected to the link. The master node will subsequently resume sending Verification Request messages and Verification Reply messages when it again receives the Change message after having been forwarded among the nodes connected to the link.

The master node will also disable verification by refraining from sending Verification Request and Verification Reply messages when it has decided to make changes in the distribution of slot ownership. It will then transmit a Change message reflecting the new distribution of ownership. The master node will subsequently resume sending Verification Request messages and Verification Reply messages when it again receives the Change message after it having been forwarded among the nodes connected to the link.

According to an alternative embodiment, a node will, when caused to disable its sending of Verification Requests and Replies with respect a link connected to one of interfaces, also disable its sending of Verification Requests and Replies with respect other links that the node has interfaces to. The reason for this is that if a node is connected to, for example, a dual ring, a detected change with respect to one of the rings can be regarded likely to be accompanied by a corresponding change on the other one of the rings. As inconsistencies hence might occur on both rings, it can accordingly be regarded as most safe to for the node to simply disable the verification procedure with respect to both rings.

Figure 2:
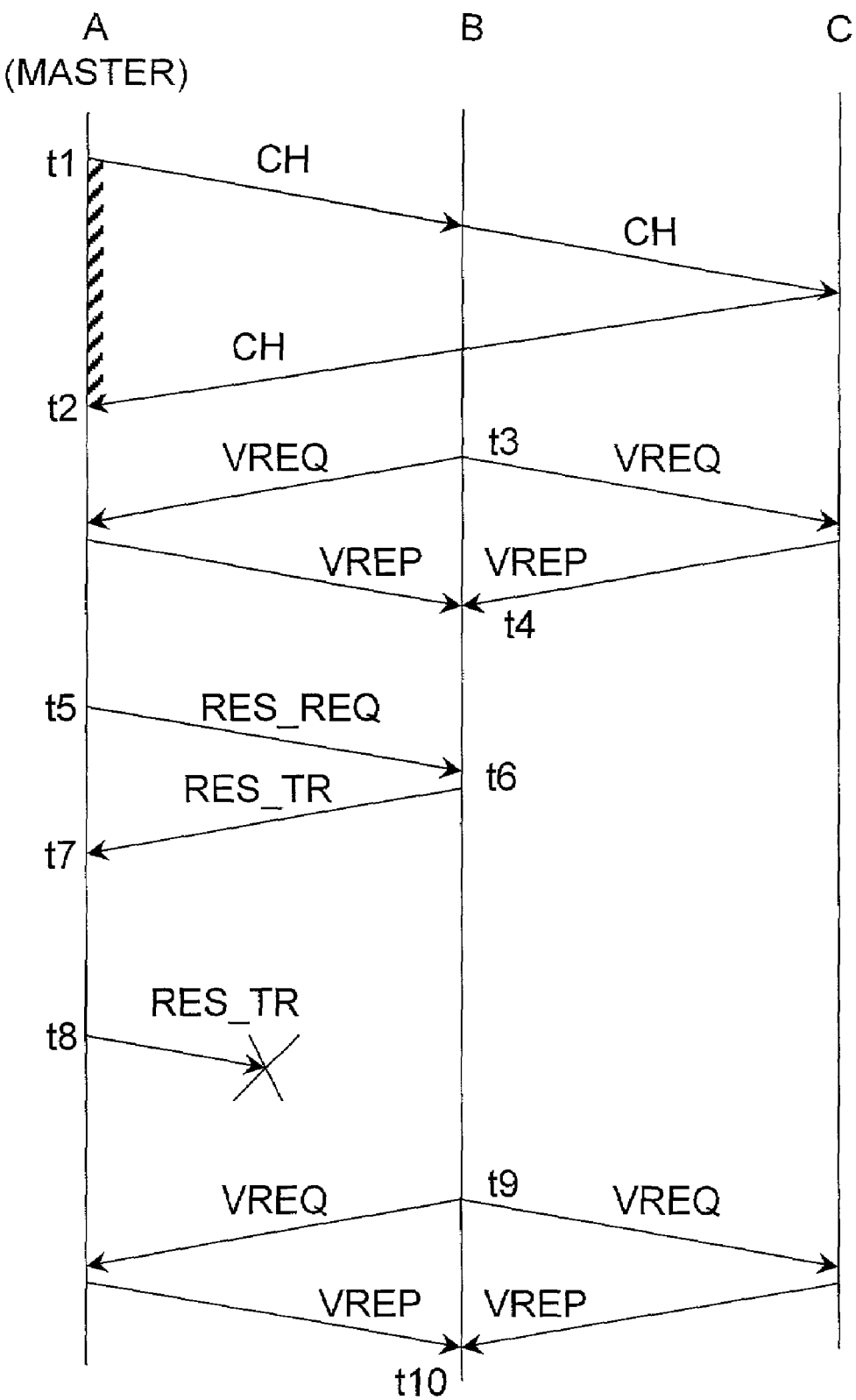
Figure 3:
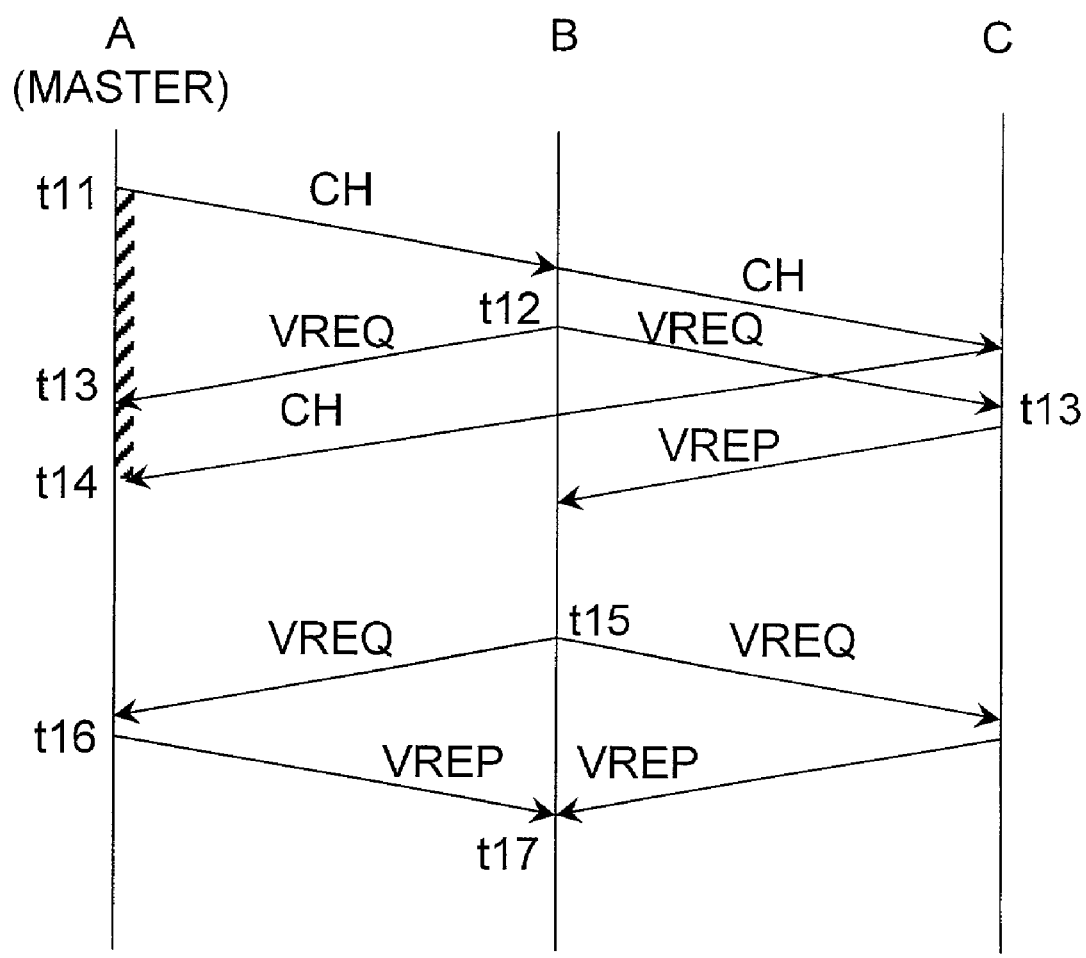
Figure 4:
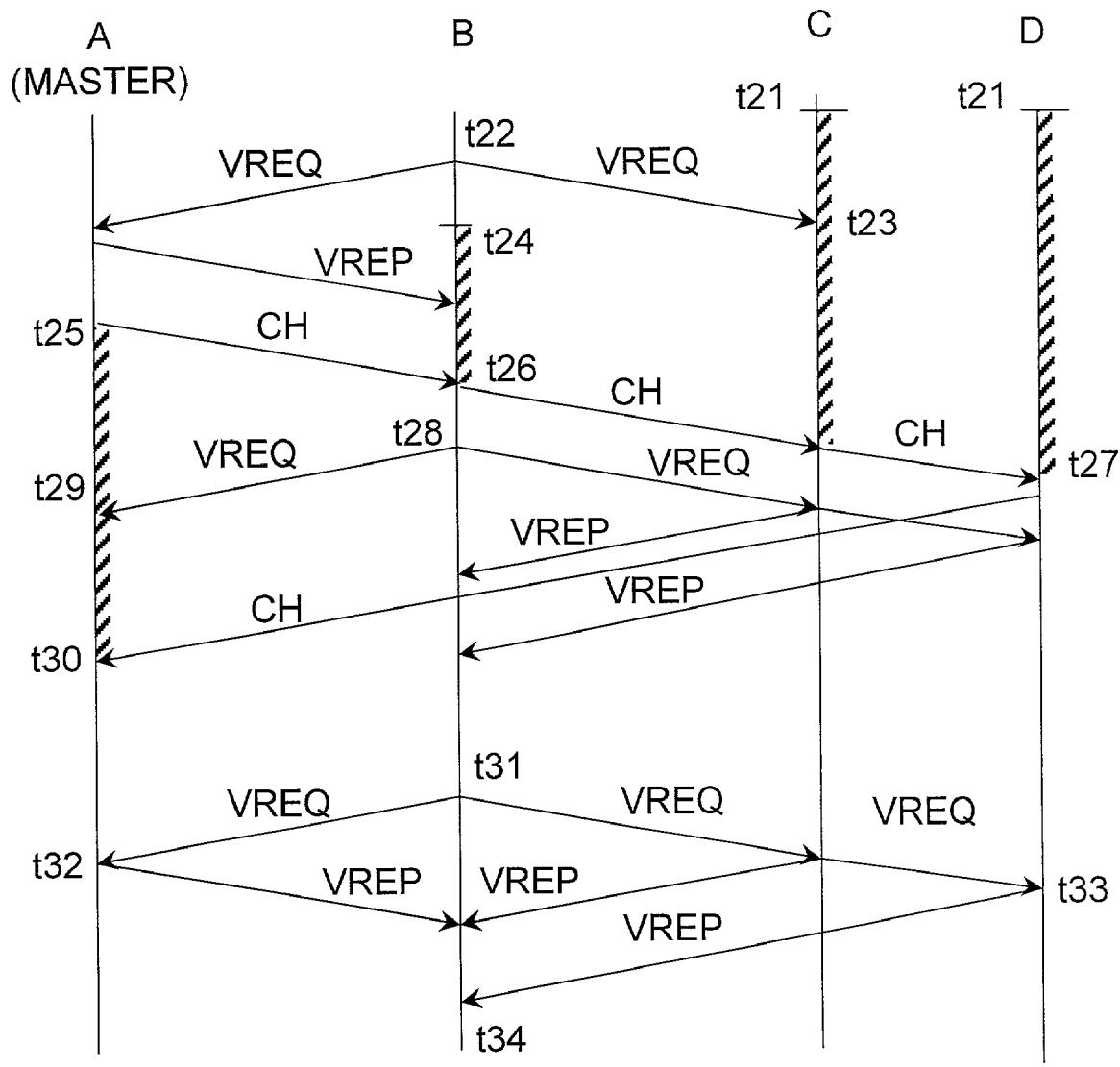

Schematic signaling diagrams illustrating message-exchanges among the nodes of the network in FIG. 1a will now be described with reference to FIGS. 2, 3 and 4, illustrating the three nodes A, B and C with arrows representing messages transmitted among the nodes. Note that time flows from top to bottom in the figures.

In FIG. 2, node A, being the master node, starts up the link by sending (at time t1) a Change message CH to node B, which in turn forwards the message to node C to then be returned to node A (at time t2). The change message identifies a list of the nodes connected to the link and the distribution of ownership to slots on the link. As nodes B and C in this case is assumed to store link data (as derived by a Link State Protocol not presented more in detail herein) that correlates with the data included in the change message, they accept the Change message and forward it as described. Otherwise, they would have discarded the message, causing retransmission thereof from the master node.

During the time interval from t1 to t2, the master node will refraining from sending Verification Request and Verification reply messages, thereby effectively disabling the verification procedure, as illustrated further below. To be noted, throughout these figures, the patterned columns along the timelines of the different nodes, such as the one between the markings t1 and t2 in FIG. 2, represent time intervals during which the respective node is disabling the verification procedure by refraining from sending Verification Request and Verification reply messages.

At t3, node B starts sending Verification Request messages VREQ with respect to all the new nodes that it was assigned ownership of in the previous Change message. As neither node A nor node B disable the verification procedure at this point in time, they will both reply to node B with Verification Replies VREP messages, which are received at node B at time t4. If we assume that neither of these replies indicate that A or C is using the slots that the Verification Request referred to, node B may now regard these slots as free and may accordingly allocate them for use as desired. To be noted, nodes A and C will perform similar verification procedures with respect to the slots that they were respectively assigned ownership of in the Change message CH. However, for simplified explanation, these parallel verification procedures have not been illustrated in the figure.

At t4, it is assumed that node A, for one reason or another, has a need for more resources, and therefore sends a Resource Request message RES_REQ to node B, asking to borrow a number of slots that node B is the owner of. Node B is assumed to be able to accommodate this request, and therefore transfers access to a set of slots to node A by sending a Resource Transfer message RES_TR to node A. This message is received at node A at time t7, which may then start using the set of slots, identified in the message, as borrowed slots.

At time t8, node A is finished using the borrowed slots and "returns" them to node B by sending a Resource Transfer message RES_TR to node B, identifying the subject set of slots. However, for unknown reasons, the message gets lots on its way to node B and is never received at node B. Node B will therefore continue to believe that node A is still borrowing the slots.

However, node B will repeatedly perform verification procedures with respect to all slots that it is the owner of and that it considers to be lent to other nodes. At the end of a timer local to node B, it therefor sends, at time t9, a Verification Request message VREQ referring to the lent set of slots to all other nodes on the link. Nodes A and C responds using Verification Reply messages VREP that reaches node B at time t10. As non of these identify node A or node C as using the slot, node B can conclude that the slot is no longer borrowed by node A (nor by any other node). Node B may therefore again consider the subject set of slots as free for and may accordingly allocate them for use as desired.

Continuing with reference to FIG. 3, at time t11, the master node A has determined a need for changing the distribution of ownership among the nodes connected to the link and therefore send, at t11, a new Change message CH identifying the new distribution to the other nodes on the link. At the same time, it disables its participation in the verification procedure, as illustrated by the start of the patterned column.

At t12, node B receives the Change message CH, identifies the new distribution, and forwards the Change message CH to node C, which subsequently forwards it back to node A to reach node A at time t14.

It is assumed that the Change message CH states that node B has been given ownership of more slots that previously. Node B will therefore, immediately after receiving the Change message CH, initiate verifying procedures with respect to all new slots that is has become the owner of. This is done at time t12 by node B sending Verification Request messages VREQ to nodes A and C, identifying the new slots.

Node C replies to the Verification Request message it has received from node B by sending a Verification Reply message back to node B at time t13. However, node A receives the Verification Request message VREQ from node B at point t13, i.e. prior to receiving the Change CH message from node C which takes place later at time t14. Node A is therefore still in its state of disabling the verification procedure, not yet having ensured that all nodes are aware of the new ownership distribution, and will therefore send no reply to the Verification Request message VREQ from node B.

As node B never receives any Verification Reply message from node A, it will continue to consider the status of the new slots as unsure and will hence not start using the new slots. Instead, it waits for a predefined period of time, at the end of which (at time t15), it once again initiates a verifying procedure with respect to the new slots, by sending out new Verification Request messages. When receiving the request, at time t16), node A will have had time to receive the acknowledging Change CH message from node C (at time t14), and will no longer disable the verification procedure. Hence, both node A and node C now responds to the request by sending their Verification Reply messages VREP to reach node B at time t17. If it is assumed that neither of these replies indicate that A or C is using the slots that the Verification Request referred to, node B may now regard the new slots as free and may accordingly allocate them for use as desired.

Continuing with reference to FIG. 4, it is now assumed that a fourth node D is connected to the link. This is detected by the operation of a Link State Protocol at nodes C and D at time t21, at node B at time t24 and at node A at time t25, at which points in time the respective node will disable the verification procedure, as indicated by the start of the patterned columns along the respective nodes' timeline.

Node B, for one reason or another, initiates a verification procedure for a specific set of slots at time t24, prior to becoming aware of the new node D at time t24, and sends Verification Request messages VREQ to nodes A and C (and not to node D as it is so far unaware of the existence of node D). However, when node C receives this message at time t23, it is already disabling the verification procedure as it has become aware of the new node at time t21 and consequently sends no reply to the verification message to node B, rendering the verification uncompleted at node B, as has been discussed above. When node B subsequently, at time t24, becomes aware of the new node, it also disables the verification procedure and stops sending Verification Request messages.

As stated, node A becomes aware of the new node D at time t25 and sends a Change message CH containing the new list of nodes connected to the link and including any changes in ownership distribution. This message is received at node B at time t26, to be forwarded to node C and to subsequently reach node D at time t27. When this Change message reaches node B, C, and D, they will conclude that it is consistent with the new link data that their respective instances of the Link State Protocol have provided, and will thus accept and forward the Change message, and at the same time stop their disabling of the verification procedure, as indicated by the bottom end of the three patterned columns along the timelines of node B, C and D. However, the verification procedure will not become fully enabled until the Change message CH once again reaches the master node A at time t30 and the master can conclude that all nodes are aware of the new link information and thus stop disabling the verification procedure. Accordingly, when prior to that, node B, having stopped its disabling of the verification procedure when receiving the Change message CH at time t26, once again, at t28, tries to initiate a verification for the above mentioned set of slots by sending Verification Request messages to node A, C and D, this verification will be blocked by node A.

As node B only receives Verification Reply messages from nodes C and D but not from node A, it will continue to consider the status of the set of slots as unsure and will hence refrain form regarding the subject set of slots as free for use. Instead, it waits for a predefined period of time, at the end of which (at time t31), it once again initiates a verifying procedure with respect to the set of slots, by sending out new Verification Request messages to nodes A, C and D. When receiving the request, at time t32), node A will have received the acknowledging Change CH message from node D (at time t30), and will no longer disable the verification procedure. Hence, both node A, C and D now responds to the request by sending their Verification Reply messages VREP, the last thereof to reach node B at time t34. If it is assumed that neither of these replies indicate that A, C or D is using the slots that the Verification Request referred to, node B may now regard the new slots as free and may accordingly allocate them for use as desired.

To be noted, when referring in this document to message being exchanged between nodes connected to the link, that may favorably be implemented as processes being performed by, and messages being exchanged by, the nodes' interfaces to the subject link, as each node may have separate processes in operation with respect to separate links that the node has interfaces to.

Even though the invention has been exemplified above using embodiments wherein a verifying feature according to the invention is used primarily for verifying or monitoring a conflict free write access situation, and/or a conflict free slot ownership distribution, both being preferred uses, it may just as well be used to verify any other type of slot/token access status.

Also, even though the invention has been described using embodiment wherein a verifying feature according to the invention is used with respect to access to one or more slots, it may just as advantageously be used to in systems wherein access to a slot or set of slots may be limited to a portion of a link, thereby making it possible for two or more link interfaces to use the time slot on separate portions of the link. The inquiries and replies related to a verifying procedure according to the invention would then preferably include optional information on which portion of a link over which a link interface considers itself to have write access to the subject slot (or slots).

As is understood, many different alterations and modifications with respect to embodiments described above, as realized by those skilled in the art, may be made within the scope of the invention, which is defined by the accompanying claims.

The invention claimed is:

1. A method in a communication network having a number of nodes connected to the same link, the capacity of the link being divided into frames which in turn are divided into time slots, comprising:
   a procedure for informing each node on the link of which nodes that are connected to the link and which slots that it has access to;
   a verifying procedure for subsequently verifying that information separately held by said nodes is not inconsistent regarding the nodes' right to allow sending of data in said slots; and the step of
   disabling said verifying procedure from producing a positive verification during transition periods at which different nodes on the link risk having inconsistent link data.

2. A method according to claim 1, said transition periods starting each time when determining that new link data is present and ending each time when determining that other nodes on the link has become aware of said new link data.

3. A method according to claim 1, said disabling being performed during transition periods at which new link data occurs, said link data being of a type that different nodes participating in said verifying procedure use as a basis for determining their input to said verifying procedure.

4. A method according to claim 1, said transition periods including periods at which new link data occurs defining which nodes that are connected to the link.

5. A method according to claim 1, said transition periods including periods at which new link data occurs defining which nodes that have ownership of which slots, said ownership referring to the respective node's right to allow sending of data in said slots.

6. A method according to claim 1, said verifying procedure comprising a node on the link sending a request message to the other nodes on the link asking for verification referring to said other nodes' information on their access to a slot, and each of said other nodes responding thereto by sending a reply message to said node informative of their respective information on their access to said slot.

7. A method according to claim 6, said disabling of said verifying procedure including at least one node receiving such a request message refraining from sending such a reply message in response thereto.

8. A method according to claim 6, said disabling of said verifying procedure including at least one node receiving such a request message refraining from sending such a reply message in response thereto, to the extent said reply message indicates no obstacle for the node that sent the request message to put said slot into use.

9. A method according to claim 6, said disabling of said verifying procedure including one or more nodes refraining from sending such request messages to other nodes on the link.

10. A method according to claim 1, wherein said nodes are assigned ownership of a respective set of slots, said ownership referring to the respective node's right to allow sending of data in said set of slots.

11. A method according to claim 10, said verification procedure being initiated repeatedly by a node with respect to all slots it has been assigned ownership of to verify that no other node considers itself to have access to said slots, such a verification being a prerequisite for allowing sending of data in said slot.

12. A method according to claim 10, said verification procedure being initiated at least once by a node after each change in what slots the node is assigned ownership of with respect to all slots that it has been assigned ownership of to verify that no other node considers itself to have access to said slots, such a verification being a prerequisite for allowing sending of data in said slot.

13. A method according to claim 10, said verification procedure being initiated at least once by a node after each change in what slots the node is assigned ownership of with respect to all new slots that it has been assigned ownership of and did was not assigned ownership of prior to said change, to verify that no other node considers itself to have access to the new slots, such a verification being a prerequisite for allowing sending of data in said slot.

14. A method according to claim 10, wherein control of the allocation of write access to a slot includes the right to allocated said slot for use by a communication channel that is handled by the node as well as the right to the temporary allow another one of said nodes to use said slot.

15. A method according to claim 14, said verification procedure being initiated repeatedly by a node with respect to all slot that it is assigned ownership of and that it has temporarily other ones of said nodes to use, to verify whether or said other ones of said node are still considering themselves allowed to use said slots.

16. A method according to claim 15, said node regarding a slot, which it has allowed another node to use, as free for said node to again allow for use as desired, if the result of said verification procedure state that no node on the link other than the said node considers itself allowed to use said slot.

17. A method according to claim 1, said verification procedure being used to verify that no two or more nodes regard themselves as free to use, or put into use, the same time slot for sending data.

18. A method according to claim 1, said disabling including each individual node on said link also, when disabling said verifying procedure for said link, disabling any corresponding verifying procedures that the node participates in with respect to other links that the node is connected to.

19. A method according to claim 1, said disabling comprising each one of said nodes disabling said verifying procedure from producing a positive verification when determining that new link data is present and discontinuing its disabling when receiving a link data message confirming other the new link data.

20. A method according to claim 1, said disabling comprising:

each one of said nodes disabling said verifying procedure from producing a positive verification when determining that new link data is present, and discontinuing its disabling when receiving a link data message, originating from a master node on the link, confirming the new data; and said master node disabling said verifying procedure from producing a positive verification when determining that said new link data is present, transmitting said link data message confirming the new data to other nodes on the link, and discontinuing its disabling when receiving acknowledgement that all nodes have received said link data message.

21. A method according to claim 20, said link data message originating from said master node and being circulated among the nodes connected to said link until it again reaches the master node, thus forming said acknowledgement.

22. A method according to claim 21, each node refraining from forwarding said link data message if the information contained therein is inconsistent with the node's own link information.

23. A method according to claim 21, each node, if receiving said link data message and finding the information contained therein to be is inconsistent with the node's own link information, sending an inconsistency message informative of the inconsistency to the master node.

24. A method according to claim 23, said master node, if receiving such an inconsistency message, resending a new link data message including link data that have been modified to eliminate the detected inconsistency.

* * * * *